No. 771,131.  
PATENTED SEPT. 27, 1904.  
A. J. DELAVIGNE.  
INDICATOR CHART FOR BUSINESS EXCHANGES.  
APPLICATION FILED APR. 15, 1903.  
NO MODEL.

*Rules*

The importers (or buyers) whose numbers are on this Board, having already expressed their willingness to buy from the exporters (or sellers) who are represented by numbers on the same line, the exporter or seller's name will be given to the buyer accepting an offer, at the time of signing the contract of sale, immediately after his acceptance of the said offer. — NOTE.- The letter "N" means that the seller on that line wishes to make new or more business connections. The buyer wishing to know the name of the seller, will see the operator.

| Sellers No. of offer | Quantity | Quality | Price | Terms | Date | Shipment from | to | Buyers — Numbers representing the name of buyers who accept offers on the same line | For Reply by | Total to verify |
|---|---|---|---|---|---|---|---|---|---|---|
| 1 | 200 | Fair | 11 | C+f | Mar | Galveston | Bremen | 3-5-7-8-10-11- | 11am | 6 |
| N  2 | 1000 | Good | 15 | C.i.f | Apr | N.O. | Havre | 1-2-4-5-7- | 10am | 5 |
| 3 | 100 | Medium | 14 | C.i.f 6% | Feby | Ala | Liverpool | 3-5-7-9-10- | 11am | 5 |
| 4 | 800 | Extra | 20 | f.o.b. | May | Houston | Genoa | 4-5-6-9-11- | 1pm | 5 |
| N  5 | 50 | Fair | 10½ | c.f. | March | Vicksburg | Havre | 5-7-9- | noon | 3 |
| 6 | 2000 | Good | 14 | (do) | Mar. | N.O. | Bremen | 1-2-5-6-7-8-9-10-11- | 9am | 9 |
| 7 | | | | | | | | | | 33 |
| 8 | | | | | | | | | | |
| 9 | 2 | 2 | 2 | 2 | 2 | 2 | | 2 | 2 | 2 |
| 4  5 | 6 | 7 | 8 | 9 | 10 | 11 | | 12 | 13 | 14 |

*Index*

The buyers whose numbers are on the annexed board can accept any offer which is placed on the same line as their numbers. The first one accepting, will have the sale confirmed to him by the operator of the board, who will then, only, give him the name of the seller.

Buyers numbers.

The following are the numbers of the firm offers, any one of which can be accepted by the 1st buyer, who does so + whose number is on the same line as the number of the offer.

| Total to verify | 30 | 31 | | 32 |
|---|---|---|---|---|
| 2 | 1 | | offer # 2 | # 6 - |
| 2 | 2 | | " | 2 - 6 - |
| 2 | 3 | | " | 1 - 3 - |
| 6 | 4 | | " | 2 - 4 - |
| 2 | 5 | | " | 1-2-3-4-5-6- |
| 2 | 6 | | 25 | 4-6- |
| 5 | 7 | | " | 1-2-3-5-6- |
| 2 | 8 | | " | 1-6- |
| 4 | 9 | | " | 3-4-5-6- |
| 3 | 10 | | " | 1-3-6- |
| 3 | 11 | | " | 1-4-6- |
| 33 | | | | |

WITNESSES:  
A. R. Appleman  
E. E. Ellis

INVENTOR  
Alphonse J. Delavigne  
BY Munn  
ATTORNEYS.

No. 771,131.

Patented September 27, 1904.

UNITED STATES PATENT OFFICE.

ALPHONSE J. DELAVIGNE, OF NEW ORLEANS, LOUISIANA.

INDICATOR-CHART FOR BUSINESS-EXCHANGES.

SPECIFICATION forming part of Letters Patent No. 771,131, dated September 27, 1904.

Application filed April 15, 1903. Serial No. 152,674. (No model.)

*To all whom it may concern:*

Be it known that I, ALPHONSE J. DELAVIGNE, a citizen of the United States, and a resident of New Orleans, in the parish of Orleans and State of Louisiana, have invented a new and Improved Indicator-Chart for Business-Exchanges, of which the following is a full, clear, and exact description.

This invention relates to indicator boards or charts; and it consists, substantially, in the device hereinafter particularly described and claimed.

The improvements have reference more especially to boards or charts for use by companies or commercial exchanges engaged in the buying and selling of different commodities—say grain, cotton, or oil, for instance; and the principal object of the invention is to provide means for visually indicating both to buyers and sellers of merchandise and other goods which particular offer or offers for the purchase or sale of the goods may be accepted by each buyer or seller and also to provide a board or chart whereby business may be transacted between buyers and sellers even if one of the two parties to the transaction should be absent and also arranged and operated so that none but those closing such transactions will know by whom the offers are made.

A further object of the invention is to provide, in addition to the said matter on the chart an index by which the buyers can ascertain at a glance the numbers representing the several sellers whose offers they may accept.

The above and additional objects are attained by means substantially such as are shown in the accompanying drawing, which illustrates a front view of an indicator board or chart embodying my improvements.

Specific reference being had to the drawing, 1 represents a board or chart embodying my improvements and which may comprise a card, blackboard, (either rigid or flexible,) or other similar device having written, printed, or otherwise inscribed thereon a series of vertical lines 2, spaced apart to form columns of different widths, as indicated, from 3 to 14, inclusive, the outermost of said lines 2 being extended at 16 and 17 and intersected, preferably, by a horizontal line 18, while extending inwardly from the lower end of each of said lines is a shorter horizontal line 19, these latter lines intersecting with the upper ends of lines 20 20, the lower ends of which are connected by the horizontal line 21, it being here mentioned that this general configuration may represent the outline or shape of the board itself or else be simply inscribed in any suitable manner upon the face of an ordinary card or board of any desired shape or material. Extending across the indicator board or chart are parallel horizontal lines 22 and 23, which cut or intersect the said vertical lines 2, as shown, while the face of the lower part of the board is divided by the vertical lines 24 and 25 into columns 26, 27, and 28 of different widths and also divided horizontally by the lines 29 and 30, forming spaces 31 and 32, which are separated vertically by the upper part of the said line 25, also as shown. In the large space 33 of the indicator board or chart is suitably inscribed the rules or direction under which the transactions are to be conducted.

Each of the horizontal columns numbered from 3 to 14, inclusive, has a suitable caption-space at the top that contains an inscription directing the kind of matter that is to be placed in the said column in the operation of the device. In the caption of column 4 is an inscription directing that the number of the seller is to be placed in that column. The captions of the succeeding columns 5 to 11, inclusive, each contain a direction that a certain specific condition of the transaction is to be placed in said column. For instance, the caption 34 of the column 5 shows that the quantity of the goods is placed in said column. The caption 35 of the column 6 denotes that the quality of the goods is there set forth. The caption 36 relates to the price; 37, to the terms; 38, to the date, and 39 and 40 to the points of shipment of the goods, as will be readily understood. One of said columns, preferably the column 12, has a caption directing that the numbers representing the buyers who can accept offers according to the terms of the contract as indicated in said columns 5 to 11, inclusive, are to be placed in this column. For example, a certain number of buyers who can accept the offer as set forth in the horizontal line of details across the column have their designating-numbers set down in transverse alinement with said line of detail. Then opposite the second horizontal line of details and the second number, designating a seller, in this column 12 are placed the numbers of the buyers who can accept the contract from the second seller in accordance with the details as set forth in the second horizontal line across the columns, and so on down the chart for any desired number of sellers. If desired, a column may be provided, as 13, containing a caption 42 indicating the time at which said offer will close, and a column 14 may contain a caption 43 giving the number of buyers in each horizontal line in the column 14. There may also be a column, as 3, provided in which the seller may put down any predetermined character indicating that he wishes to make new business connections.

In explanation of the advantages of my indicator board or chart as thus far described it may be stated that the same is intended to be operated at some central office or exchange to which the different buyers and sellers have access under some arrangement or understanding with the management, and by its use the sellers of commodities of goods may dispense with the services of agents or brokers located in other cities or ports or assist these agents or brokers, if they wish to use the chart, it being the present practice of the agents or brokers of the sellers whose offers appear on the upper part A of the board or chart—as No. 6, for instance—to call on each of the eleven buyers, (whose numbers or other designating characters appear in the column 12,) whereas by the means such as I have herein shown the characters for the buyers are placed in such relative association with those for the sellers that either buyer may determine whether to accept the offer made to him by simply examining the board or chart after the same has been placed in position by the operator for inspection, it being apparent that all the offers are placed on the board or chart as soon as received by the said operator. In this way also the buyer will have before him at one time all offers of sale which may be made from many points and from many sellers, and he may accept just the offer which suits him. At the time of such acceptance, together with the signing of the proper contracts, the buyer then learns the name of the seller, and vice versa.

The operation of my chart as above set forth is facilitated by the use of an index, as represented from the lower part of the chart, which is arranged substantially as follows: In the space 44 is inscribed matter indicating that the buyers whose numbers are on the above portion of the chart can accept any offer which is placed on the same horizontal line as their numbers and that the first buyer accepting shall have the sale confirmed to him by the operator of the chart, who will then, and preferably then only, disclose the name of the seller. In the space 31 of the index is a caption for the column 27, indicating the buyer's numbers are to be placed in a series down the column. These are preferably in numerical order. The space 28 adjacent the space or column 27 contains a caption 32 indicating that the numbers in the space 28 are the numbers corresponding to the sellers in the above portion of the chart, any one of which seller's offer can be accepted by the first buyer who so indicates and whose number is in horizontal alinement with the number of the offer.

From the drawing it will be seen that in the column 21 is placed the numbers of the buyers from "1" to "11," inclusive. Now it will be observed in the main portion of the chart that in the column of buyers the number "1" occurs in horizontal alinement with the seller No. 2 and also with the seller No. 6. Hence in the column 28 these numerals "2" and "6" are placed in horizontal alinement with the buyer No. 1. By the same procedure it will be seen that buyer No. 2 has his numeral also opposite seller No. 2 and seller No. 6 and also that buyer No. 3 has his designating-numeral in alinement with the sellers' numbers "1" and "3." Hence the numerals "1" and "3" are placed in horizontal alinement with the buyer No. 3 in the index. If desired, an additional column 26 may be provided in the index, wherein is placed in horizontal alinement with the buyers' numbers and the corresponding numbers of the sellers the total number of the sellers in the said sellers' column. For instance, the first four buyers each have two sellers—that is, two offers—while the fifth buyer, it will be seen, has six offers. It will be understood, of course, that the board or chart is to be used or employed in like manner to indicate offers of buyers to sellers, the only change therein necessary for this purpose being simply in the wording at the headings of the different columns, as is apparent. In the event a buyer should wish to communicate with seller No. 3, for instance, the word "Call" or other character agreed upon may be placed opposite his number, as above, and this seller would then report to the operator of the board, who would give him the name of the buyer or party so wishing to communicate with him without letting others present know by whom or for whom the call was made.

Of course any number of columns and designating characters may be employed, and it will be understood that a section or part of the chart or board may be ruled off, so as to enable to be placed at the top of each column the name of the branch or department of the business of that section.

Having thus described my invention, I claim as new and desire to secure by Letters Patent—

A chart having thereon a series of parallel columns, each having a caption-space; one of said captions containing matter directing that certain characters representing the sellers are to be placed in the column; one or more captions each directing that a specific detail relating to the sale is to be placed down the column; a caption containing matter directing that certain characters representing the buyers who can accept the offers of said sellers in said column and in accordance with the details disposed transversely across said columns, shall be placed in said latter column opposite the transverse line of said sellers and details, said transverse series to be placed in a longitudinal series down the column opposite the several transverse lines of said sellers and said details of contract, and an index comprising a column having a caption containing matter directing that said characters representing the buyers are to be placed down the column; and another column in the index containing matter directing that in alinement with each buyer shall be placed the character of those sellers, in alinement with whose character the buyers' characters have been placed in the aforesaid series of columns.

In testimony whereof I have signed my name to this specification in the presence of two subscribing witnesses.

ALPHONSE J. DELAVIGNE.

Witnesses:
WM. J. FORMENTO,
W. A. BRAND.